United States Patent [19]

Okubo et al.

[11] Patent Number: 5,689,355
[45] Date of Patent: Nov. 18, 1997

[54] REPEATER USING OPTICAL CABLES FOR RADIO PAGING SYSTEM

[75] Inventors: Yoichi Okubo, Tokorozawa; Michio Norichika, Tachikawa; Takashi Yokote, Hamura; Hiroshi Suzuki, Hamura; Tadashi Akiyama, Hamura; Jun Suganuma, Yokosuka, all of Japan

[73] Assignees: Kokusai Electric Co., Ltd.; NTT Mobile Communications Network Inc., both of Tokyo, Japan

[21] Appl. No.: 674,213

[22] Filed: Jul. 1, 1996

Related U.S. Application Data

[63] Continuation of Ser. No. 407,415, Mar. 17, 1995, abandoned.

[30] Foreign Application Priority Data

Mar. 24, 1994 [JP] Japan ................................. 6-076306
Oct. 3, 1994 [JP] Japan ................................. 6-260933

[51] Int. Cl.⁶ ........................... H04B 10/16; H04B 10/00
[52] U.S. Cl. .................... 359/179; 359/145; 359/152; 359/167
[58] Field of Search ........................ 359/145, 152, 359/167, 174, 179; 379/56; 455/33.1

[56] References Cited

U.S. PATENT DOCUMENTS 5,159,479  10/1992  Takagi ................................. 359/174
5,400,391  3/1995  Emura et al. ........................ 379/56

FOREIGN PATENT DOCUMENTS 0143854  11/1980  Japan ................................. 359/145

*Primary Examiner*—Kinfe-Michael Negash
*Attorney, Agent, or Firm*—Emmanuel J. Lobato; Burns & Lobato, P.C.

[57] ABSTRACT

A repeater which is installed as measures for silent zones, which automatically compensates for a variation in a light loss caused by a difference in length among optical cables interconnecting a master device and a plurality of slave devices which are allocated and installed in an underground shopping center or the like. The master device and the slaves devices both have current detectors for detecting current values of O/E transducers which transduce received lights to electric signals. Based on the detected current values, gain control signals are applied to variable gain amplifiers to change their amplification factors so that the levels of output RF signals for transmission to a radio base station and a portable station have a prescribed value, thereby compensating for the variation in the light loss of the optical cables. The present invention greatly facilitates the installation of the repeater and additional installation of slave devices.

6 Claims, 6 Drawing Sheets

REPEATER USING OPTICAL CABLES FOR RADIO PAGING SYSTEM

This is a continuation of application Ser. No. 08/407,415, filed Mar. 17, 1995 now abandoned.

BACKGROUND OF THE INVENTION

The present invention relates to a repeater which is installed to compensate for silent zones in portable, car and similar telephone systems and, more particularly, to a repeater using an optical cable for optical analog transmission and a lightwave receiver for use in the repeater.

For example, a cellular telephone system comprises a switching center connected to a telephone network, a plurality of distributed radio base stations connected to the switching center via inter-station links and a number of portable cellular telephones.

Upon dialing a call number of a portable telephone set from a telephone set, the radio base station of the service area concerned sends radio waves to call up the portable cellular telephone, permitting two-way communication.

With a view to further upgrading services of such a cellular telephone system, repeaters have been introduced in silent zones where no radio waves can be received, such as underground shopping centers and tunnels, to repeat and amplify radio waves from radio base stations, enabling communication by portable cellular telephones (mobile stations) even in the silent zones.

FIG. 4 is a block diagram of a repeater 2 to which the present invention is intended to apply. In FIG. 4, reference numeral 1 denotes a radio base station, 31 a radio frequency stage, 32 an electro-optic transducer (E/O) for transducing an electric signal to a lightwave, 33 a branching circuit, 5 optical cables, 4 a plurality of slave devices, 34 opto-electric transducers (O/E) each for transducing a lightwave to an electric signal, 40 a signal combiner, 3 a master device and 6-1 to 6-n radio zones.

As shown in FIG. 4, the repeater 2 is composed of the master device 3, the plurality of slave devices 4-1 to 4-n and optical cables 5 interconnecting them. The radio frequency stage 31 receives radio waves from the radio base station 1 and outputs an amplified RF signal. The RF signal from the radio frequency stage 31 is transduced, by the E/O transducer 32 using a light-emitting diode such as a semiconductor laser diode, to an intensity-modulated lightwave, which is branched by the branching circuit 33 to the plurality of slave devices 4. The plurality of slave devices 4 are dispersed over the range of 1 m to 20 km, for instance, so that the respective zones 6-1 through 6-n cover the entire area of a silent zone such as an underground shopping center or tunnel. The slave devices 4 and the master device 3 are interconnected using low-loss (0.3 db/km to 0.5 db/km) optical cables 5 for optical analog transmission.

The slave devices 4 each has an O/E transducer for directly detecting the intensity modulated lightwave and a radio frequency stage for amplifying and transmitting the detected RF signal from an antenna. Transmitted waves from mobile stations (portable cellular telephone sets) in the radio zones 6 of the respective slave devices 4 are received and amplified in the radio frequency stages via the antennas of the slave devices 4. As in the master device 3, the received waves are transduced by E/O transducers to intensity modulated lightwaves, which are sent via the cables 5 to the master device 3 together with monitor data; in the master device 3, the lightwaves are transduced by the opto-electric (O/E) transducers 34 to electric signals, then combined by the combiner 40 and input into the radio frequency stage 31.

FIG. 5 is a block diagram showing a conventional two-way communication circuit of the master device 3 and one of the slave devices 4 in FIG. 5. The construction of the master device 3 is the same as depicted in FIG. 4, but the illustrated construction of the slave device 4 is a specific operative example. In the slave device 4, reference numeral 41 denotes a radio frequency stage, 42 an O/E transducer, 43 an E/O transducer and 46 a variable gain amplifier. An antenna connected to a branching circuit is a duplex antenna for transmission to and reception from mobile stations which move in the zone. The variable gain amplifier 46 is to provide a prescribed RF output for transmission by adjusting a circuit gain difference resulting from the difference in length between the optical cables 5 at the time of installation of the slave device 4.

In a long and narrow area such as a tunnel, the slave devices 4 of the conventional system are allocated and arranged for a required distance from the master device 3 in such a manner that the zones 6 link one after another just like a chain, whereas in an area such as an underground shopping center, they are arranged in a big matrix form. In the two cases, the optical cables interconnecting the master device 3 and the slave devices 4 differ from one another in length with the slave devices 4; the cable to the nearest slave device is one to several meters but the cable to the remotest slave device may sometimes become as long as 20 km.

As referred to previously, the optical cable is low-loss but has a loss of 0.3 to 0.5 dB/km. Hence, in the case of installing such a repeater 2, the loss of light in the optical cable varies or scatters from 0 to 10 dB according to the position of the respective slave device 4, and in terms of an electric signal, the loss varies in the range of 0 to 20 dB, twice as large as that of the light loss.

Thus, the level of the output RF signal from the antenna of each slave device 4 varies with the length of the optical cable between it and the master device 3. In the CATV or similar system of the type generating a reconstructed image in an image receiver connected directly to the antenna terminal, a little variation in the antenna output level does not matter. In the portable cellular telephone system which sends out radio waves from the antenna of each slave device 4, however, it presents problems as the distance of travel of radio waves and the area of the radio zone inevitably vary with slave devices 4. To avoid this, it is customary in the prior art to manually adjust the gain of the variable gain amplifier 46 at the time of installation of each slave device to compensate for differences among losses by the optical cables of different lengths so that the radio zones of the respective slave devices 4 have about the same area and that radio waves from the antennas are set out at substantially the same level. Hence, the installation of the conventional repeater requires much labor and much time.

Next, a description will be given of the variation in the output RF signal level which is attributable to different lengths of the optical cables.

FIG. 6 is a graph showing an example of the light intensity modulation characteristic of the E/O transducer 32 formed by a light emitting diode, that is, the relationship of the modulated optical output to the input RF signal, or the relationship between the current of the light emitting diode and the optical level thereof. It is seen from FIG. 6 that, when driven with a high-frequency signal (the input RF signal) superimposed on its bias current, the light emitting diode generates an analog intensity modulated optical output.

Letting the modulation factor for the input RF signal be represented by m, the optical output is expressed by A (1+m sin pt) cos ωt, and the demodulated version of this output is 2×10 log A +20 log m[dB] in dB terms. The first term of this equation, that is, 10 log A[dB], represents the optical level.

FIG. 7 is a graph explanatory of the direct detecting operation (i.e. the modulating operation) of a photodiode used as the O/E transducer 42, 34-1 or 34-2 in FIG. 5.

Upon application of an optical input of a level A to the photodiode from the optical cable 5, a current B flows in the photodiode. Hence, when the optical input A is intensity-modulated by an RF signal a, an RF signal b is superimposed on the photodiode current B in the optical output from the photodiode 46. That is, when the optical input level is A and the modulation factor for the RF signal a is m, the detected output RF current is b.

When the optical cable 5 is long and hence is high-loss and the optical input level is A', however since the modulation factor m is fixed, the photodiode current decreases from B to B' and the output RF current also decreases from b to b' as shown in FIG. 7. It is necessary, therefore, to compensate for, by the variable gain amplifier 46, the decrease in the output RF signal from b to b', that is, an increase in the loss of the electric signal corresponding to a value twice the loss of the optical cable which causes the increase in the optical input level from A to A'.

While a defect of a down link from the master device 4 to the slave device 4 has been described, an up link has the same defect.

As described above, when the conventional repeater using the optical analog transmission scheme is installed or the slave devices 4 are newly provided, the variable gain amplifier 46 must be adjusted manually. This involves the transportation of a measuring instrument to the field for measurement and adjustment of the variable gain amplifier 46, and hence requires much labor and much time.

SUMMARY OF THE INVENTION

An object of the present invention is to provide a lightwave receiver from which an RF output signal of a prescribed level can be obtained without involving the necessity for manual adjustment of the amplification factor when the level of the received optical input varies.

Another object of the present invention is to provide a repeater for a radio paging system which automatically compensates for variations in a loss by the optical fiber according to the position of installation of each slave device, permitting appreciable reduction of labor and time for the installation of the repeater itself.

Still another object of the present invention is to provide a repeater for a two-way communication system such as a portable telephone system which automatically compensates for variations in the received optical input level by different lengths of optical cables between the master device and the slave devices, thereby permitting appreciable reduction of labor and time for the installation of the repeater itself and ensuring the formation of radio zones of about the same area.

To attain the above objects, the devices of the present invention have the constructions listed below.

A repeater of the present invention with comprises:

a master device which transduces an RF signal received via a down link from a radio base station into a light intensity-modulated signal, branches and outputs it from a plurality of output terminals and which transduces a plurality of light intensity-modulated signals of up links, received via a plurality of input terminals corresponding to a plurality of said output terminals, into RF signals by first opto-electric transducers, respectively, combines the RF signals into a composite signal to be sent out to the radio base station;

a plurality of pairs of optical cables, each pair comprising one of down-link optical cables connected to a plurality of said output terminals of the master device, respectively, and one of up-link optical cables connected to the input terminals of the master device, respectively; and slave devices each of which is connected to one of a plurality of pairs of said optical cables, transduces a light intensity-modulated signal, received via the down link optical cable, into an RF signal by a second opto-electric transducer and sends it out to a portable station and each of which transduces an RF signal received from a portable station into a light intensity-modulated signal and provides it onto the up-link optical cable.

The master device includes: a plurality of first current detectors for detecting current values of the first opto-electric transducers, respectively; a plurality of variable gain amplifiers for amplifying output signals from the first opto-electric transducers, respectively; and a first control circuit which compares the detected value from each of a plurality of said first current detectors with a preset reference value and applies a control signal to the corresponding one of the variable gain amplifiers to change its gain to reduce the difference to zero.

The slave devices each include: a second current detector for detecting the current value of the second opto-electric transducer; a variable gain amplifier for amplifying the output signal from the second opto-electric transducer; and a second control circuit which compares the detected value from the second current detector with a preset reference value and applies a control signal to the variable gain amplifier to change its gain to reduce the difference to zero.

With the repeater of the above construction, the levels of the RF signal outputs from the master device and the slave devices are held constant regardless of the lengths of the pairs of optical cables interconnecting the slave devices and the master device.

A repeater of the present invention comprises:

a master device which transduces an RF signal received via a down link from a radio base station into a light intensity-modulated signal, branches and outputs it from a plurality of output terminals and which transduces a plurality of light intensity modulated signals of up links, received via a plurality of input terminals corresponding to a plurality of said output terminals, into RF signals by first opto-electric transducers, respectively, combines the RF signal into a composite RF signal for sending the same to the radio base station;

a plurality of pairs of optical cables, each pair comprising one of down-link optical cables connected to a plurality of said output terminals of the master device, respectively, and one of up-link optical cables connected to the input terminals of the master device, respectively; and slave devices each of which is connected to one of a plurality of pairs of said optical cables, transduces a light intensity-modulated signal, received via the down-link optical cable, into an RF signal by a second opto-electric transducer and sends it out to a portable station and each of which transduces an RF signal received from a portable station into a light intensity-modulated signal and provides it onto the up-link optical cable.

The master device includes: a plurality of variable gain amplifiers for amplifying output signals from the first opto-electric transducers; a first modem for monitored data, for extracting control data added to monitored data included in the composite RF signal; and a first control circuit which follows the extracted control data to apply a control signal to the corresponding variable gain amplifier to change its gain.

The slave devices each include: a second current detector for detecting the current value of the second opto-electric transducer; a variable gain amplifier for amplifying the output signal from the second opto-electric transducer; a second control circuit which compares the detected value from the second current detector with a preset reference value and applies a control signal to the variable gain amplifier to change its gain to reduce the difference to zero; and a second modem for monitored data which derives the control signal from the second control circuit, adds the monitored data with the control data composed of the number of the slave device concerned and a corrected value and superimposes the control data and the monitored data on the RF signal to be sent to the portable station.

With the repeater of the above construction, the level of the RF signal outputs from the master device and the slave devices are held constant regardless of the lengths of the pair of optical cables interconnecting the slave device and the master device.

A repeater of the present invention comprises:
a master device which receives an RF signal from a radio base station in a radio paging system, superimposes the received RF signal on light of a fixed level and sends out a plurality of optical outputs from a branching circuit;
a plurality of optical cables connected at one end to the branching circuit of the master device to transmit a plurality of said optical outputs, respectively, and
a plurality of slave devices connected to a plurality of said optical cables, respectively, each slave device including a lightwave receiver which receives one of the optical outputs from the master device via the optical cable connected to the slave device and amplifies, by a variable gain amplifier, the RF signal extracted by an opto-electric transducer and outputs it at a prescribed level, and an antenna for sending out the RF signal.

The lightwave receiver of each slave device includes: a current detector for detecting a current value of the opto-electric transducer; and a control circuit for applying to the variable gain amplifier a gain control signal based on the detected current value from the current detector so that the RF output signal has the prescribed level.

With the repeater of the above construction, the RF signal output from each slave device has the prescribed level regardless of the length of the optical cable interconnecting the slave device and the master device.

A lightwave receiver of the present invention, comprises: an opto-electric transducer which receives an optical output of a fixed level with an RF signal superimposed thereon via an optical cable of an unspecified length and transduces the received optical output into an RF signal, and a variable gain amplifier for amplifying the output from the opto-electric transducer to provide an RF output signal of a prescribed level.

The lightwave receiver further comprises:
a current detector for detecting the current value of the opto-electric transducer which linearly varies with a level fluctuation of the optical input into the opto-electric transducer; and a control circuit for applying to the variable gain amplifier a gain control signal based on the detected current value from the current detector so that the RF output signal has a prescribed level.

With the above construction, a loss proportional to the length of the optical cable is compensated for so that the RF output signal has always the prescribed level regardless of the length of the optical cable.

Moreover, the lengths of a plurality of pairs of the optical cables can be defined in the range of 1 m to 20 km.

BRIEF DESCRIPTION OF THE DRAWINGS

The present invention will be described in detail below with reference to accompanying drawings, in which.

PREFERRED EMBODIMENTS OF THE INVENTION

Figure 1:
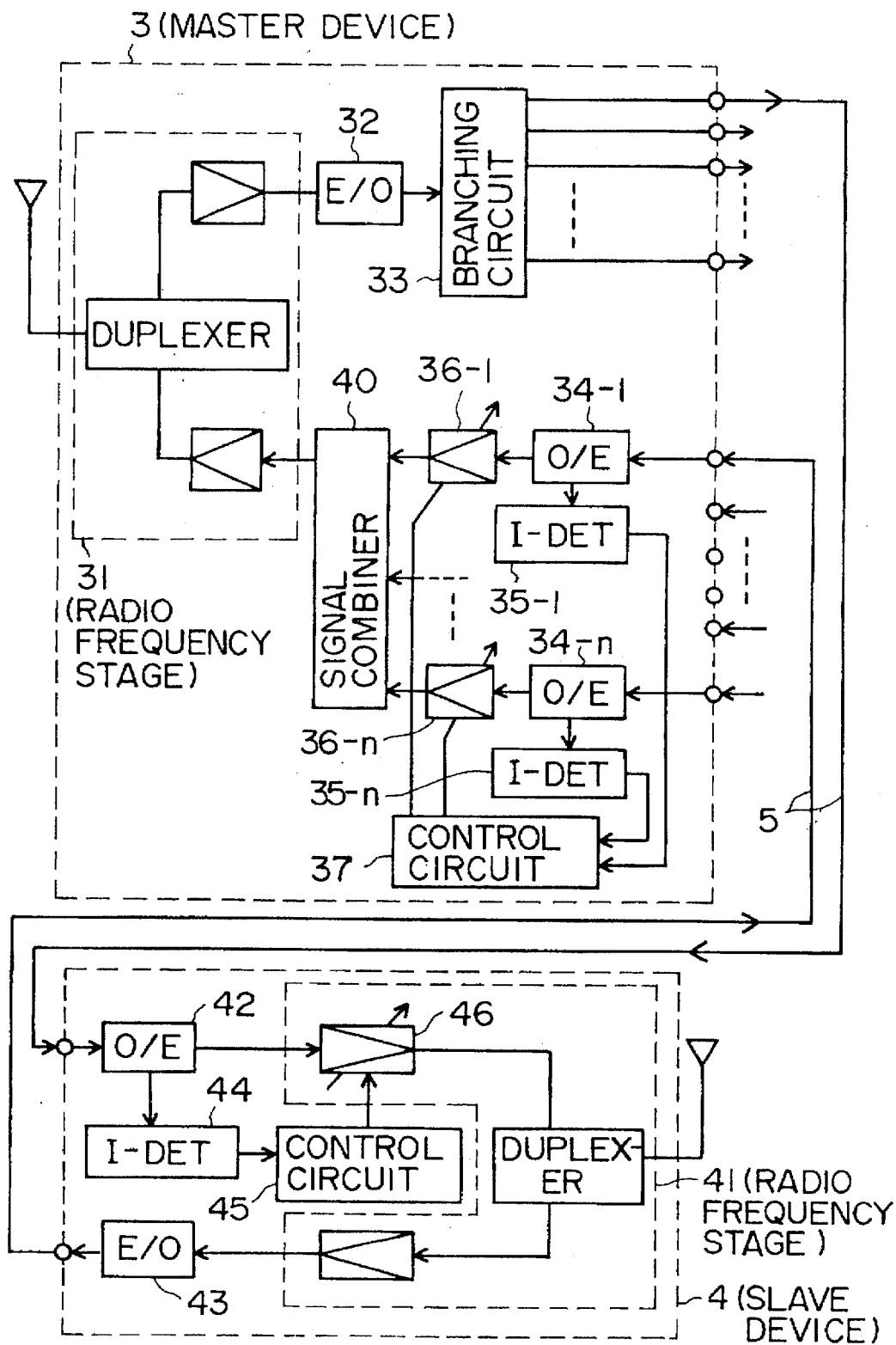
FIG. 1 is a block diagram illustrating a first embodiment of the present invention.
Figure 4:
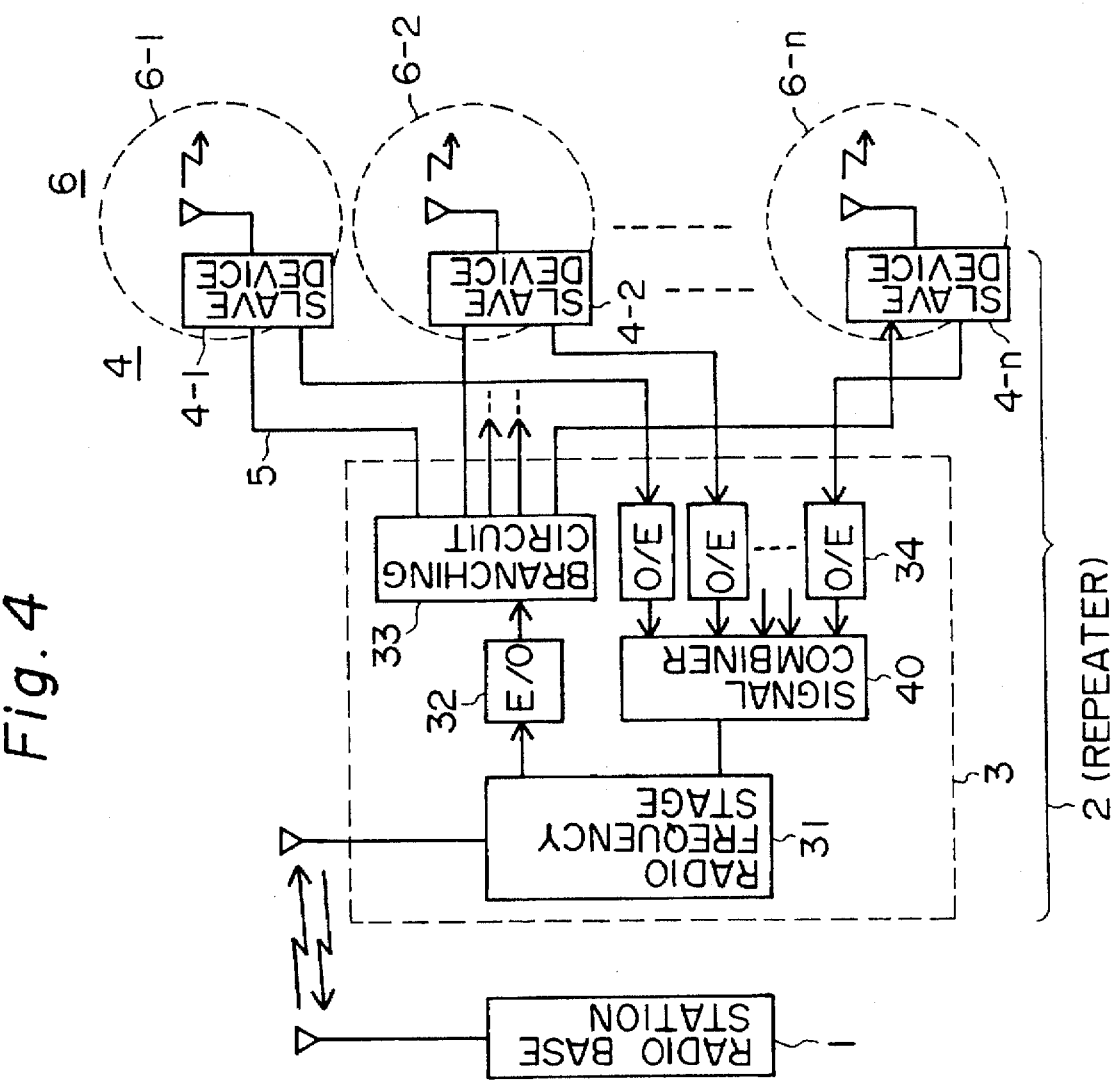
FIG. 4 is an example of a system to which the present invention is applied.
Figure 5:
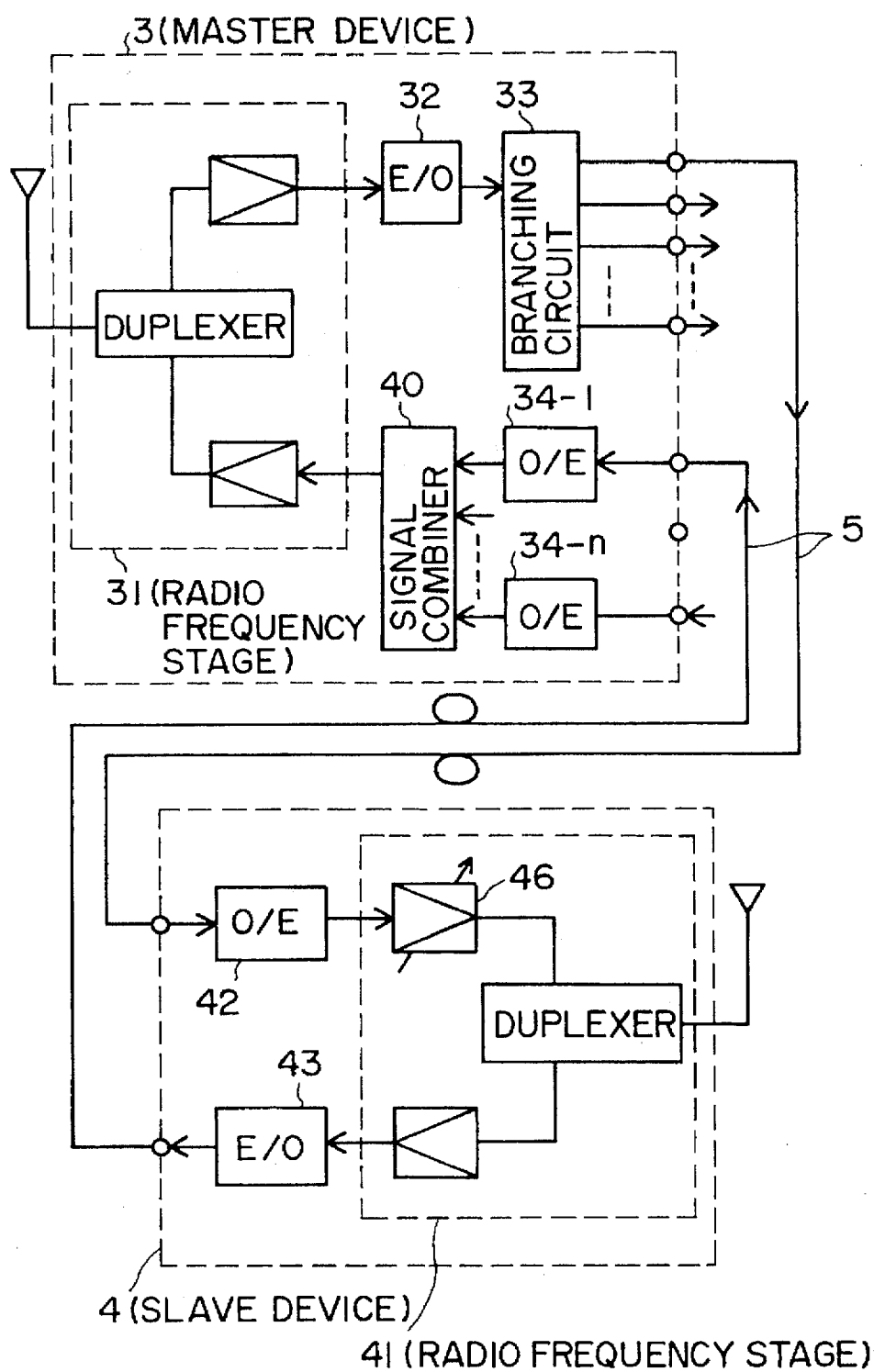
FIG. 5 is a block diagram showing a prior art example.
Figure 6:
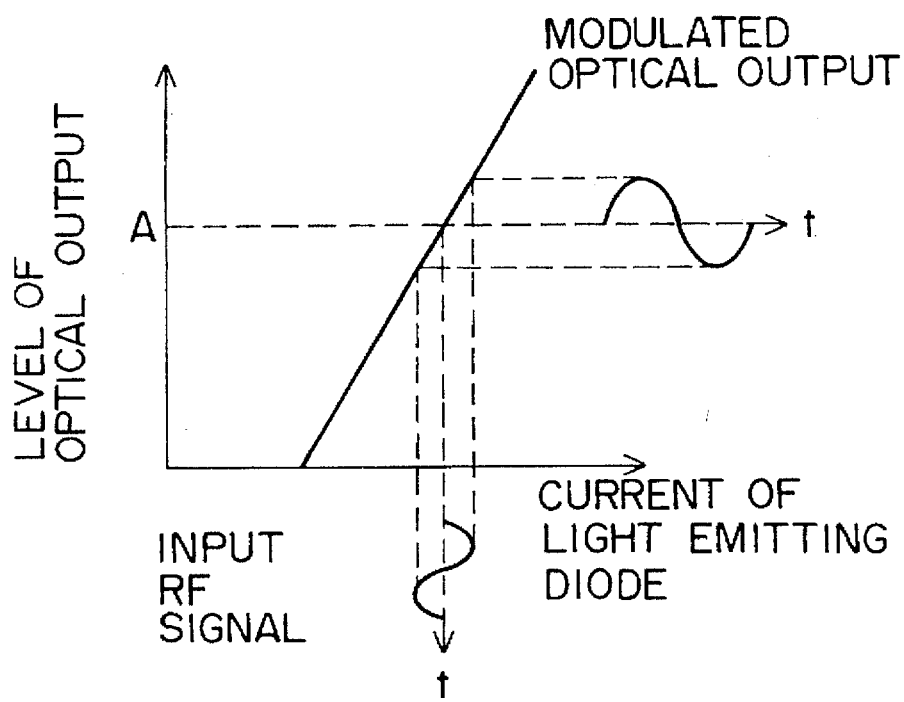
FIG. 6 is a graph showing an example of an electro-optic transducing (direct modulation) characteristic.

FIG. 1 illustrates in block form a first embodiment of the present invention, in which the parts corresponding to those in FIG. 4 are denoted by the same reference numerals. This embodiment differs from the prior art example in that the optical input detecting stage of either of the master device 3 and the slave device 4 includes means for detecting the level of the optical input from the optical cable 5 and means for effecting control on the basis of the detected level to hold the detected RF signal at about the same level.

In the master device 3 there are provided current detectors (I-DET) 35-1 to 35-n for detecting current values of O/E transducers 34-1 to 34-n which detect lightwaves sent via up-link optical cables 5 from the respective slave devices 4. Disposed between the O/E transducers 34-1 to 34-n and the signal combiner 40 are variable gain amplifiers 36-1 to 36-n. The current values detected by the current detectors 35-1 to 35-n are input into a control circuit 37. The control circuit 37 converts the respective detected current value by an A/D converter to a digital value, then estimates the loss of the optical cable concerned from a DC current value, which is a reference value (a value when the length of the optical cable is 0 m), and applies a gain control signal to the concerned one of the variable gain amplifiers 36-1 to 36-n to change its amplification factor so that its output level takes a predetermined value. The DC current value and the gain correcting value are prestored in the control circuit 37 after being calibrated.

In each of the slave devices 4, the current value of an O/E transducer 42 formed by a photodiode or the like, which detects a lightwave sent via the down-link optical cable 5 from the master device 3, is detected by a current detector (I-DET) 44, and a control circuit 45 uses the detected value to estimate the loss of the optical cable from the same DC current value as mentioned above and controls the gain of the variable gain amplifier 46 as in the master device 3.

The variable gain amplifiers 36-1 to 36-n and 46 may each be a variable attenuator or a combination of an amplifier and a variable attenuator.

Figure 7:
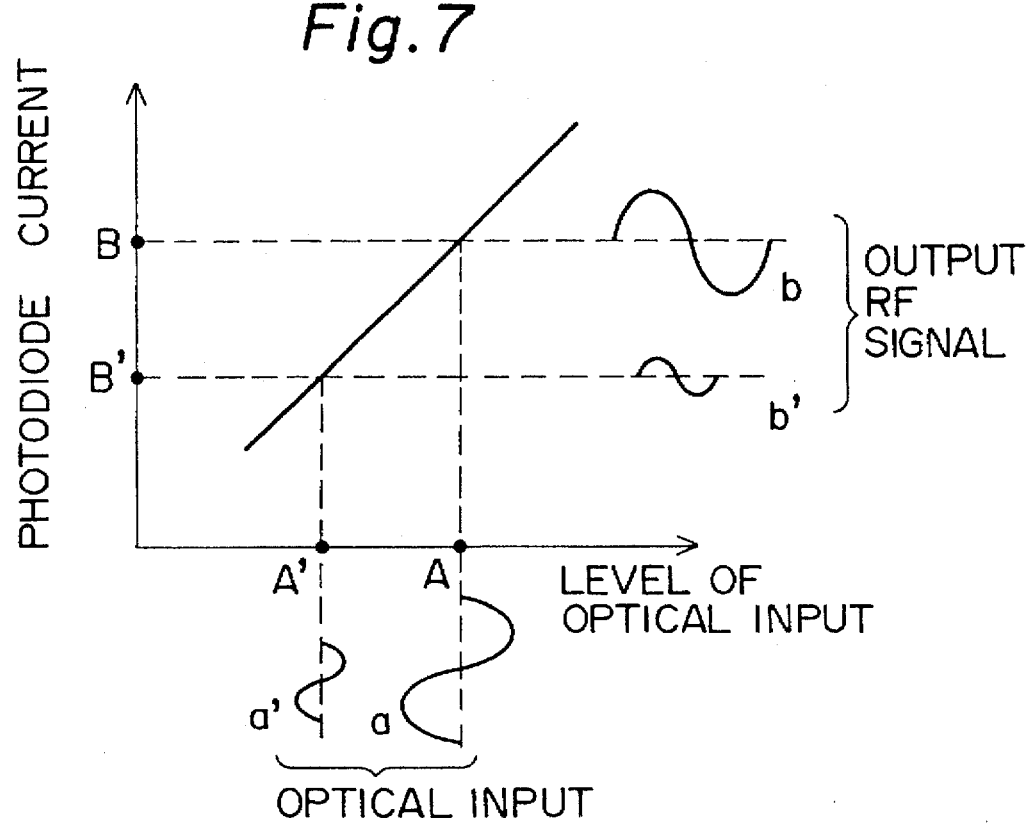
FIG. 7 is a graph showing an example of an opto-electric transducing (direct detection) characteristic, explanatory of the operation of the present invention.

When a photodide is used as each of the O/E transducer 34 and 42, the current flowing in the photodiode linearly varies with a variation in the optical input level as depicted in FIG. 7. That is, the DC current value of the O/E transducer 42 or 34 corresponding to the level of the input light which is received via the optical cable 5 from the master device 3 or slave device 4 of the repeater 2 is detected by the current detector 44 or 35.

The control circuit 37 (45 in the slave device 4) converts the detected current value, then estimates the loss of the optical cable from the above-mentioned reference DC current value and a gain control signal to the variable gain amplifier 36 (46 in the slave device 4) to change its amplification factor so that its output RF signal voltage takes a predetermined value. A DC current value vs. optical cable loss (the gain of the variable gain amplifier, in practice) is prestored in a memory of the control circuit, and hence the loss of the optical cable can easily be estimated.

Figure 2:
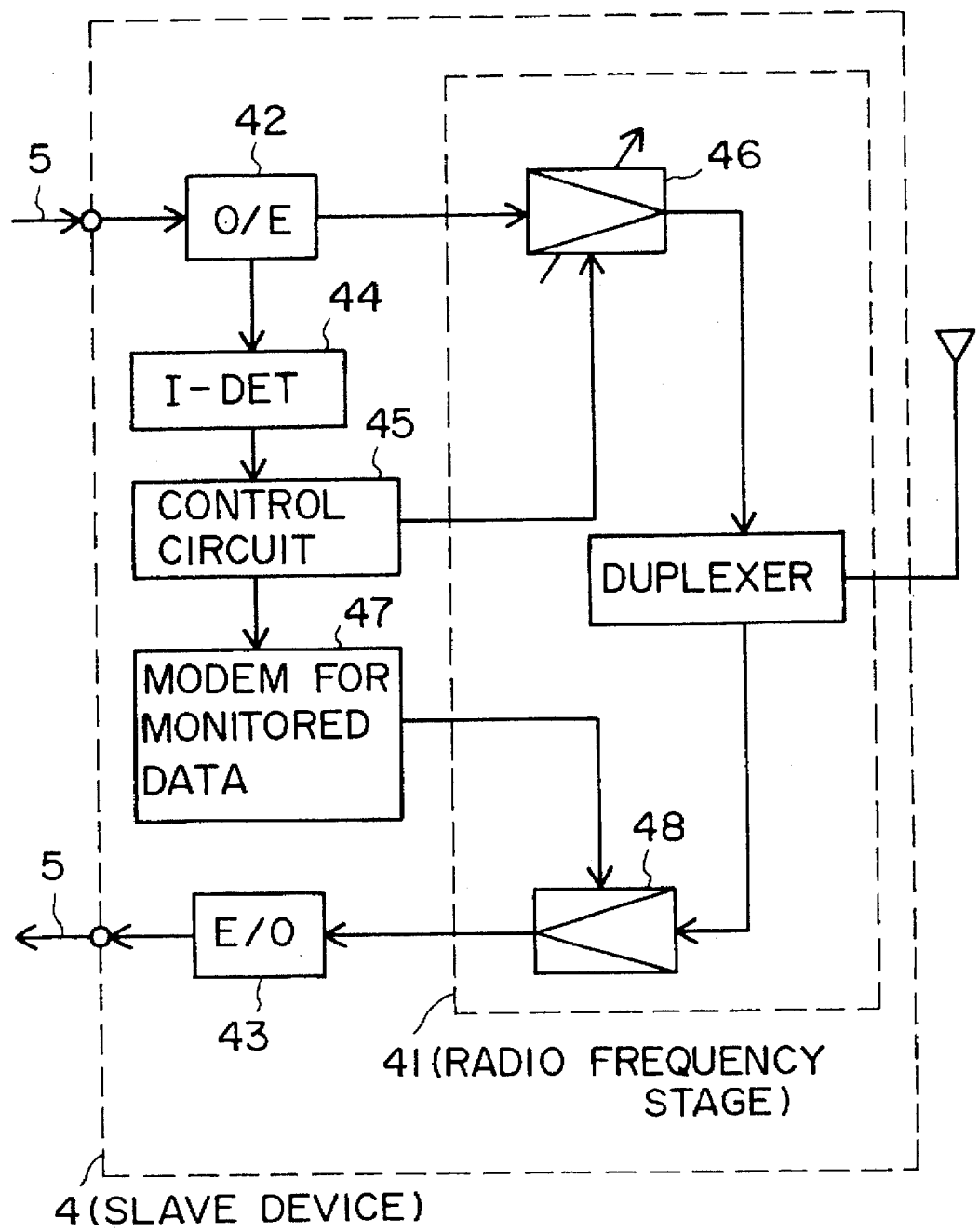
FIG. 2 is a block diagram illustrating the slave device side of a second embodiment of the present invention.
Figure 3:
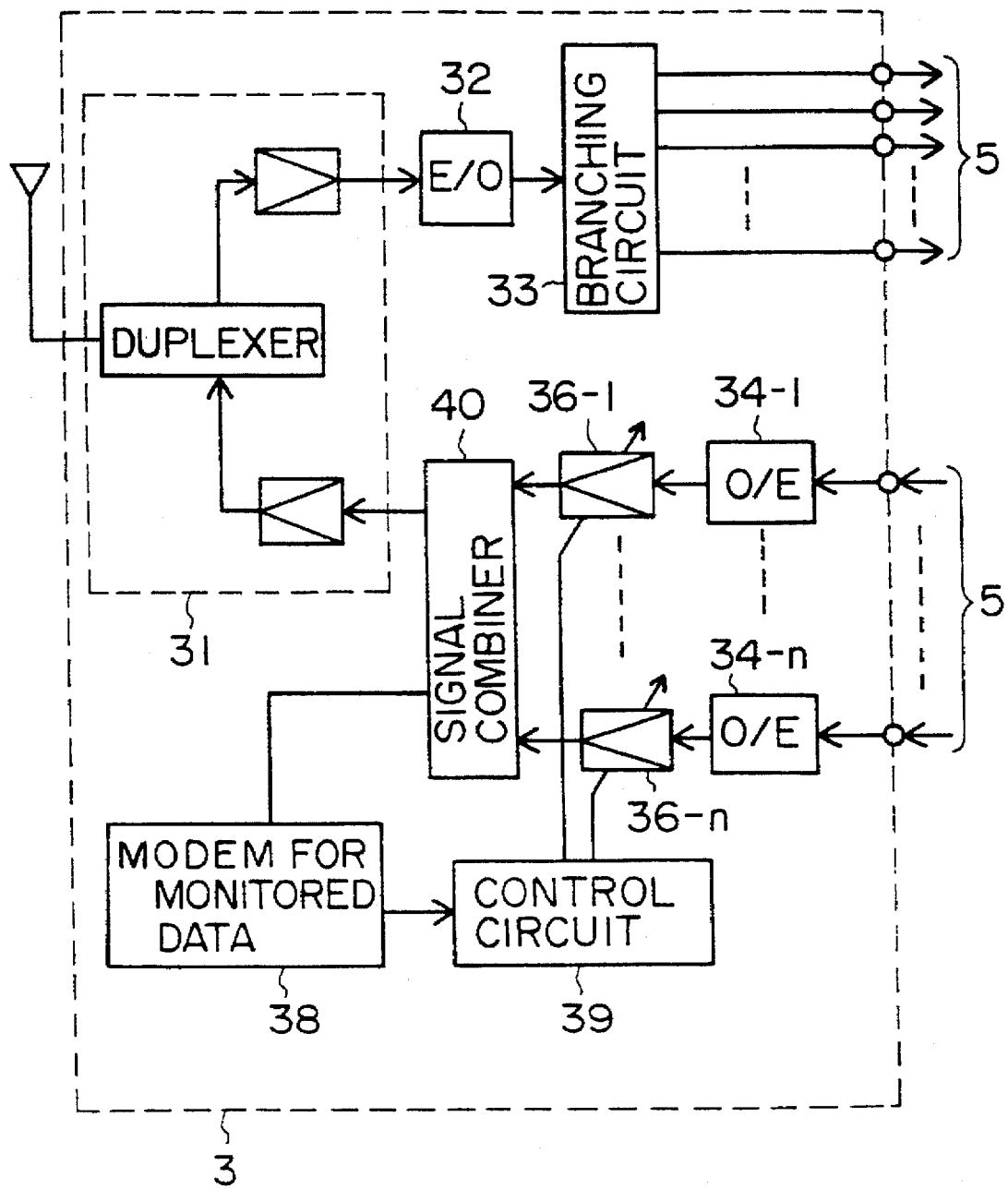
FIG. 3 is a block diagram illustrating the master device side of the second embodiment of the present invention.

FIGS. 2 and 3 are block diagram illustrating a second embodiment of the present invention, FIG. 2 showing the slave device side and FIG. 3 the master device side. The parts corresponding to those in FIG. 1 are identified by the same reference numerals. In this embodiment, since the up- and down-link optical cables 5 interconnecting the master device 3 and the slave device 4 have about the same length, control data for compensating for the loss of the down-link optical cable detected in the slave device 4 is added to monitored data which is sent from the slave device 4 to the master device 3, the control data is used to control the gain of the variable gain amplifier in the master device 3.

In the salve device 4 of FIG. 2, reference numeral 47 denotes a modem for monitored data, which modulates gain control data from the control circuit 45 together with other monitored data and inputs the modulated data into an amplifier 48, from which it is provided to the E/O transducer 43 together with the send signal (i.e. the up-link signal) to the master device 3.

In the master device 3 of FIG. 3, reference numeral 38 denotes a modem for monitored data, which demodulates monitored data and control data from the output of the signal combiner 40 and inputs into the control circuit 39 the control data composed of the number of the slave device and cable loss data. The control circuit 39 controls the gain of the variable gain amplifier 36 corresponding to the slave device 4 concerned. In this instance, the control data from the respective slave devices are sequentially processed by instructions (polling) from the master device 3, hence the control signals will not collide.

Incidentally, the reason for which the gain of the amplifier 48 for the up-link signal in each slave device 4 is that the operation of a laser diode, which is used as the E/O transducer 43, is set in the optimal condition. That is, an increase in the input level of the E/O transducer 43 improves the CN ratio but degrades the inter modulation, whereas a decrease in the input level improves the latter but degrades the former; therefore, the input level of the E/O transducer 43 is always set at the optimum value.

As described above, the embodiment of FIG. 1 differs from the prior art example in the provision of the current detector 35 for detecting the current value of the 0/E transducer 34 and the control circuit 37 for controlling the gain of the variable gain amplifier 36 in accordance with the detected current value.

When a photodiode is used as the O/E transducer 34, the current flowing therein linearly varies with the optical input level. That is, the current detector 35 is used to detect the DC current value of the O/E transducer 34 which corresponds to the level of the optical input which is received via the optical cable 5 from the master device 3 of the repeater 2.

The control circuit 37, for example, converts the detected current value by an A/D converter to a digital value, then estimates the loss of the optical cable from a DC current value which is a reference value (when the length of the optical cable is 0 m) and applies a gain control signal to the variable gain amplifier 36 to change its amplification factor so that the output RF signal voltage at its output terminal takes a predetermined value.

As described above in detail, according to the present invention, the levels of RF signals which are sent out from the output signal from the base antennas of slave devices connected to the master device via optical cables of different lengths and the levels of output signals transmitted from the master device to the master device to the radio base station can be automatically made substantially the same.

Accordingly, the variable range of each gain of the variable gain amplifier can set in accordance with the distance from the master device to the remotest slave device, taking into account the area and planar landform of the silent zone where the repeater is installed. Thus, the present invention permits appreciable reduction of labor and time for the installation of the repeater or additional installation of the slave device, and hence is of great utility when employed in practice.

What we claim is:

1. A repeater for repeating RF electric waves between a radio base station and portable stations comprising:

a master device for transducing, by a first electro-optic transducer, one of said RF electric waves received via a down link from said radio base station into a light intensity-modulated signal, for branching and outputting branched outputs of said light intensity-modulated signal to a plurality of output terminals, and for transducing a plurality of light intensity-modulated signals of up links, received via a plurality of input terminals providing one to one correspondence to a plurality of said output terminals, into RF electric signals by first opto-electric transducers, respectively, to combine said RF electric signals into a composite RF electric signal to be sent out to said radio base station;

a plurality of pairs of optical cables, each pair of said optical cables comprising one of down-link optical cables connected respectively, at one end thereof, to a plurality of said output terminals of said master device and corresponding one of up-link optical cables connected respectively, at one end thereof, to a plurality of said input terminals of said master device; and a plurality of slave devices each connected to other ends of one pair of a plurality of pairs of said optical cables, for transducing one of said branched outputs of said light intensity-modulated signal, received via said one of said down-link optical cables, into an RF electric signal by a second opto-electric transducer to be sent out to at least one of said portable stations and each for transducing, by a second electro-optic transducer, an RF electric signal received from said at least one of said portable stations into a light intensity-modulated signal to be provided onto said corresponding one of said up-link optical cables;

said master device comprising: a plurality of first current detectors for detecting respectively direct-current values of said first opto-electric transducers; a plurality of first variable gain amplifiers for amplifying respectively output electric signals from said first opto-electric transducers; and a first control circuit for comparing, respectively, first detected values from a plurality of said first current detectors with first preset reference values and for applying first control signals to corresponding ones of said first of said first variable gain amplifiers to change an amplification factor thereof to reduce a corresponding first difference between a corresponding one of the first detected values and a corresponding one of the first preset reference values to zero;

a plurality of said slave devices each comprising: a second current detector for detecting the direct-current value of said second opto-electric transducer; a second variable gain amplifier for amplifying the output signal from said second opto-electric transducer; and a second control circuit for comparing a second detected value from said second current detectors with a second preset reference value and for applying a second control signal to said second variable gain amplifier to change a gain thereof to reduce a second difference between the second detected value and the second preset reference value to zero; and the levels of said branched outputs of said light intensity-modulated signals for transmission from said master device to said slave devices being constant regardless of the lengths of a plurality of pairs of said optical cables respectively interconnecting said master device and said slave device.

2. A repeater for repeating RF electric waves transmitted between a radio base station and portable stations comprising:

a master device for transducing, by a first electro-optic transducer, one of said RF electric waves received via a down link from said radio basic station into a light intensity-modulated signal, for branching and outputting branched outputs of said light intensity-modulated signal to a plurality of output terminals, and for transducing a plurality of light intensity-modulated signals of up links, received via a plurality of input terminals providing one to one correspondence to a plurality of said output terminals, into RF electric signals by first opto-electric transducers, to combine said RF electric signals into a composite RF electric signal for transmission to said radio base station;

a plurality of pairs of optical cables, each pair of said optical cables comprising one of down-link optical cables connected respectively, at one end thereof, to a plurality of said output terminals of said master device and corresponding one of up-link optical cables connected respectively, at one end thereof, to a plurality of said input terminals of said master device; and a plurality of slave devices each connected to other ends of one pair of a plurality of pairs of said optical cables, for transducing one of said branched outputs of said light intensity-modulated signal, received via said one of said down-link optical cables, into an RF electric signal by a second opto-electric transducer to be sent out to at least one of said portable stations and each transducing, by a second electro-optic transducer, an RF electric signal received from said at least one of said portable stations into a light intensity-modulated signal to be provided onto said corresponding one of said up-link optical cables;

said master device comprising: a plurality of first variable gain amplifiers for amplifying output signals from said first opto-electric transducers; a first modem for monitored data, for extracting control data added to said monitored data included in said composite RF electric signal; and a first control circuit responsive to said extracted control data to apply one of first control signals to a corresponding one of said first variable gain amplifiers to change an amplification factor thereof;

a plurality of said slave devices each comprising: a current detector for detecting a direct-current value of said second opto-electric transducer; a second variable gain amplifier for amplifying the output electric signal from said second opto-electric transducer; and a second control circuit for comparing a detected direct-current value from said current detector with a second preset reference value and for applying a second control signal indicative of a compensation value to said second variable gain amplifier to change an amplification factor thereof to reduce a difference between the detected direct-current value and the second preset reference value to zero; a second modem for monitored data responsive to said second control signal from said second control circuit for deriving, from said second control signal, said monitored data composed of an identification number of said slave device concerned and said compensation value; and means for superimposing said monitored data on said RF electric signal for transmission to said light-intensity modulated signal transmitted on said corresponding one of said up-link optical cables;

levels of said RF electric waves being stably maintained at respective transmission ends of the slave station to the portable stations, where levels of branched outputs of said light intensity-modulated signals for transmission from said master device to said slave devices being constant regardless of the lengths of a plurality of pairs of said optical cables interconnecting said master device and said slave devices.

3. A repeater for repeating RF electric waves between a radio base station and portable stations in a radio paging system, comprising:

a master device for receiving one of said RF electric waves from said radio base station, superimposing said received one of said RF electric waves on a light wave of a fixed level, branching said light wave by a branching circuit to a plurality of branched optical signals for sending out to a plurality of optical outputs from a branching circuit;

a plurality of optical cables connected at one end to branched outputs of said branching circuit of said master device to transmit a plurality of said optical outputs; and a plurality of slave devices connected to other ends of a plurality of said optical cables, each slave device comprising a lightwave receiver for receiving on of said optical outputs from said master device via the optical cable connected to said slave device and amplifying, by a variable gain amplifier, said RF electric signal extracted by an opto-electric transducer and outputting said extracted RF electric signal at a prescribed level, and an antenna for transmitting said extracted RF signal;

said lightwave receiver of each slave device comprising: a current detector for detecting a direct-current value of said opto-electric transducer; and a control circuit for applying to said variable gain amplifier a gain control signal based on the detected value from said current detector so that said RF electric signal has said prescribed level;

said RF electric signal for transmission from said antenna of said slave device having said prescribed level regardless of the lengths of said optical cables interconnecting respective ones of said slave devices and said master device.

4. A repeater according to claims 1, 2 or 3, wherein the lengths of said plurality of optical cables are in the range of 1 m to 20 km.

5. A repeater for repeating RF electric waves between a radio basic station and portable stations comprising:

a master device;

a plurality of slave devices;

a plurality of pairs of optical cables connected between said master device and each of said slave devices, each pair of said optical cables comprising a down-link optical cable and an up-link optical cable;

said master device comprising a first radio frequency stage having a first antenna for receiving one of said RF electric waves from said radio base station and for transmitting one of said RF electric waves to said radio base station, a first electro-optic transducer for transducing one of said RF electric waves received via said first radio frequency stage into a light intensity-modulated signal, a branching circuit for branching said light intensity-modulated signal into a plurality of branched optical outputs, a plurality of first output terminals each connected to one end of said down-link optical cable to send out therethrough one of said branched optical outputs to a corresponding one of said slave devices, a plurality of first input terminals providing one to one correspondence to a plurality of said first output terminals and each connected to one end of said up-link optical cable to receive up-link optical signals respectively transmitted from corresponding ones of said slave devices, a plurality of first opto-electric transducers connected respectively to said first input terminals for transducing respectively said up-link optical signals into up-link electric signals, a plurality of first variable-gain amplifiers for amplifying respectively said up-link electric signals, a plurality of first current detectors for detecting respectively direct-current values of said first opto-electric transducers, a first control circuit for comparing, respectively, first detected values from a plurality of said first current detectors with first preset references values and for applying each of first control signals to corresponding one of said first variable gain amplifiers to change an amplification factor thereof to reduce a corresponding first difference between a corresponding one of the first detected values to zero, a signal combiner for combining said up-link electric signals amplified into a composite RF electric signal to said first radio frequency stage to transmit one of said RF electric waves to said radio base station;

said slave device comprising a second input terminal connected to another end of said down-link optical cable of said one pair of said optical cables, a second opto-electric transducer connected to said second input terminal for transducing one of said branched outputs of said light intensity-modulated signal transmitted via said down-link optical cable into a down-link RF electric signal, a second current detector for detecting a direct-current value of said second opto-electric transducer, a second variable gain amplifier for amplifying said down-link RF electric signal from said second opto-electric transducer, a second control circuit for comparing a second detected value from said second current detectors with a second preset reference value and for applying and second control signal to said second variable gain amplifier to change a gain thereof to reduce a second difference between the second detected value and the second preset reference value to zero, a second radio frequency stage including said second variable gain amplifier and having a second antenna for transmitting one of said RF electric waves to said portable stations and for receiving one of said R electric waves from at least one of said portable stations to provide an up-link RF electric signal, a second electro-optic transducer for transducing said up-link RF electric signal into an up-link light intensity-modulated signal, and a second output terminal connected to another end of said up-link optical cable to send out said up-link light intensity-modulated signal to said master device;

the levels of said branched outputs of said light intensity-modulated signals for transmission from said master device to said slave devices being constant regardless of the lengths of a plurality of pairs said optical cables respectively interconnecting said master device and said slave devices.

6. A repeater for repeating RF electric waves between a radio basic station and portable stations comprising:

a master device;

a plurality of slave devices;

a plurality of pairs of optical cables provided between said master device and each of said slave devices, each pair of said optical cables comprising a down-link optical cable and an up-link optical cable;

said master device comprising a first radio frequency stage having a first antenna for receiving one of said RF electric waves from said radio base station and for transmitting one of said RF electric waves to said radio base station, a first electro-optic transducer transducing one of said RF electric waves received via said first radio frequency stage into a light intensity-modulated signal, a branching circuit for branching said light intensity-modulated signal into a plurality of branched optical outputs, a plurality of first output terminals each connected to one end of said down-link optical cable to send out therethrough one of said branched optical outputs to a corresponding one of said slave devices, a plurality of first input terminals providing one to one correspondence to a plurality of said first output terminals and each connected to one end of said up-link optical cable to receive up-link optical signals respectively transmitted from corresponding ones of said slave devices, a plurality of first opto-electric transducers connected respectively to said first input terminals for transducing respectively said up-link optical signals into up-link electric signals, a plurality of first variable-gain amplifiers for amplifying respectively said up-link electric signals, a signal combiner for combining said up-link electric signals amplified into a composite RF electric signal, a first modem for monitored data, for extracting control data added to said monitored data included in said composite RF electric signal, and a first control circuit responsive to said extracted control data to apply one of first control signals to corresponding one of said first variable gain amplifiers to change an amplification factor thereof;

said slave device comprising a second input terminal connected to another end of said down-link optical cable of said one pair of said optical cables, a second opto-electric transducer connected to said second input terminal for transducing one of said branched outputs of said light intensity-modulated signal transmitted via said down-link optical cable into a down-link RF electric signal, a current detector for detecting a direct-current value of said second opto-electric transducer, a second variable gain amplifier for amplifying said down-link RF electric signal from said second opto-electric transducer, a second control circuit for comparing a second detected value from said second current detectors with a second preset reference value and for applying a second control signal indicative of a compensation value to said second variable gain amplifier to change a gain thereof to reduce a second difference between the second detected value and the second preset reference value to zero, a second radio frequency stage including said second variable gain amplifier and having a second antenna for transmitting one of said RF electric waves to said portable stations and for receiving one of said RF electric waves from at least one of said portable stations to provide an up-link RF electric signal, a second electro-optic transducer for transducing said up-link RF electric signal into an up-link light intensity-modulated signal, a second output terminal connected to the other end of said up-link optical cable to send out said up-link light intensity-modulated signal to said master device, a second modem for monitored data responsive to said second control signal from said second control circuit for deriving, from said second control signal, said monitored data composed of an identification number of said slave device concerned and said compensation value, and means for superimposing said monitored data on said RF electric signal for transmission to said light-intensity modulated signal transmitted on said corresponding one of said up-link optical cables;

the levels of said branched outputs of said light intensity-modulated signals for transmission from said master device to said slave devices being constant regardless of the lengths of a plurality of pairs of said optical cables respectively interconnecting said master device and said slave devices.

* * * * *